US 11,367,862 B2

(12) United States Patent
Kim et al.

(10) Patent No.: US 11,367,862 B2
(45) Date of Patent: *Jun. 21, 2022

(54) CATHODE AND LITHIUM BATTERY INCLUDING THE SAME

(71) Applicants: Samsung Electronics Co., Ltd., Suwon-si (KR); Samsung SDI Co., Ltd., Yongin-si (KR)

(72) Inventors: Youngsoo Kim, Suwon-si (KR); Younggyoon Ryu, Suwon-si (KR); Jaegu Yoon, Suwon-si (KR); Seungyeon Lee, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/534,206

(22) Filed: Aug. 7, 2019

(65) Prior Publication Data
US 2020/0075930 A1 Mar. 5, 2020

(30) Foreign Application Priority Data

Aug. 28, 2018 (KR) .................. 10-2018-0101564

(51) Int. Cl.
*H01M 4/131* (2010.01)
*H01M 10/0525* (2010.01)
(Continued)

(52) U.S. Cl.
CPC .......... *H01M 4/131* (2013.01); *H01M 4/505* (2013.01); *H01M 4/525* (2013.01); *H01M 4/623* (2013.01);
(Continued)

(58) Field of Classification Search
CPC ...... H01M 4/131; H01M 4/505; H01M 4/525; H01M 4/622; H01M 4/623; H01M 4/625;
(Continued)

(56) References Cited

U.S. PATENT DOCUMENTS 6,379,846 B1  4/2002 Terahara et al.
8,753,777 B2  6/2014 Choi et al.
(Continued)

FOREIGN PATENT DOCUMENTS

EP   3309879 A1   4/2018
EP   3358651    * 8/2018
(Continued)

OTHER PUBLICATIONS

EP European Search Report for European Patent Application No. 19193692.1 dated Jan. 14, 2020.
(Continued)

*Primary Examiner* — Brittany L Raymond
(74) *Attorney, Agent, or Firm* — Cantor Colburn LLP

(57) ABSTRACT

A cathode includes: a cathode active material comprising a lithium transition metal oxide; a conductive material; and a binder, wherein the lithium transition metal oxide includes nickel and a transition metal other than nickel, wherein the lithium transition metal oxide has a layered crystal structure, wherein a content of the nickel is 30 mole percent or greater, based on a total number of moles of transition metals of the lithium transition metal oxide, wherein the conductive material comprises a linear carbon conductive material, wherein the binder includes a first binder, wherein the first binder including fluorine and a polar functional group, and a second binder, which does not include fluorine, and wherein an amount of the linear carbon conductive material is 0.1
(Continued)

weight percent or greater, based on a total combined weight of the cathode active material, the conductive material, and the binder.

22 Claims, 5 Drawing Sheets

(51) Int. Cl.
  *H01M 4/525* (2010.01)
  *H01M 4/62* (2006.01)
  *H01M 4/505* (2010.01)
  *H01M 4/02* (2006.01)
(52) U.S. Cl.
  CPC ....... *H01M 4/625* (2013.01); *H01M 10/0525* (2013.01); *H01M 2004/028* (2013.01)
(58) Field of Classification Search
  CPC ..... H01M 2004/021; H01M 2004/028; H01M 10/052; H01M 10/0525; Y02E 60/10
  See application file for complete search history.

(56) References Cited

U.S. PATENT DOCUMENTS

| | | | |
|---|---|---|---|
| 9,042,341 B2 | 5/2015 | Jung et al. |
| 9,065,138 B2 | 6/2015 | Jeong et al. |
| 9,608,272 B2 | 3/2017 | Loveridge et al. |
| 9,627,690 B2 | 4/2017 | Kim et al. |
| 9,653,755 B2 | 5/2017 | Cheng et al. |
| 10,109,863 B2 | 10/2018 | Yeou et al. |
| 2012/0028117 A1 | 2/2012 | Plee et al. |
| 2013/0004657 A1 | 1/2013 | Xu et al. |
| 2017/0117533 A1 | 4/2017 | Takaichi et al. |
| 2018/0108913 A1* | 4/2018 | Zhang ................. H01M 2/166 |
| 2018/0159131 A1* | 6/2018 | Seol ................. H01M 10/0525 |
| 2018/0277848 A1 | 9/2018 | Masumura et al. |

FOREIGN PATENT DOCUMENTS

| | | |
|---|---|---|
| EP | 3358651 A1 | 8/2018 |
| JP | 2001319685 A | 11/2001 |
| JP | 2002246029 A | 8/2002 |
| JP | 2016091785 A | 5/2016 |
| JP | 6136788 B2 | 5/2017 |
| JP | 201784769 A | 5/2017 |
| KR | 100708210 B1 | 4/2007 |
| KR | 1020100081904 A | 7/2010 |
| KR | 101147602 B1 | 5/2012 |
| KR | 1020130116805 A | 10/2013 |
| KR | 1408884 B1 | 6/2014 |
| KR | 1020160012482 A | 2/2016 |
| KR | 1020160017364 A | 2/2016 |
| KR | 1665656 B1 | 10/2016 |
| KR | 101735855 B1 | 5/2017 |
| KR | 101739299 B1 | 5/2017 |
| KR | 1020170098146 A | 8/2017 |

OTHER PUBLICATIONS

Kim et al., "Electronegativity-induced enhancement of thermal stability by succinonitrile as an additive for Li ion batteries", Energy & Environmental Science, 2011, 4, 4038.

* cited by examiner

CATHODE AND LITHIUM BATTERY INCLUDING THE SAME

CROSS-REFERENCE TO RELATED APPLICATION

This application claims priority to and the benefit of Korean Patent Application No. 10-2018-0101564, filed on Aug. 28, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode and a lithium battery including the same.

2. Description of the Related Art

Lithium batteries have been used as power sources for various high-performance applications, such as electronic devices and electric vehicles. Lithium batteries having high energy density and high-capacity are desired for high performance electronic devices and electric vehicles.

High-capacity cathode active materials may be used to provide lithium batteries with high capacity.

Although a cathode active material comprising nickel provides a high discharge capacity, electrolyte side reactions may deteriorate the lifespan and thermal stability of a lithium battery.

As the loading of a cathode mixture increases, the discharge capacity may increase, however a thickness of the cathode may also increase. A cathode having an increased thickness may have reduced flexibility, and thus cracks may easily occur during a winding process or a charge/discharge process during the manufacture of the lithium battery.

Thus, there remains a need for a cathode including a cathode active material comprising nickel and having increased loading, and batteries including the same.

SUMMARY

Provided is a cathode having improved physical properties due to inclusion of a binder having a novel composition and a linear carbon conductive material.

Provided is a lithium battery including the cathode and having improved lifespan characteristics.

Provided is a lithium battery having improved energy density due to inclusion of a cathode with a high-capacity cathode active material and having an increased loading.

Additional aspects will be set forth in part in the description which follows and, in part, will be apparent from the description, or may be learned by practice of the presented embodiments.

According to an aspect of an embodiment, a cathode includes: a cathode active material including a lithium transition metal oxide; a conductive material; and a binder, wherein the lithium transition metal oxide comprises nickel and a transition metal other than nickel, and having a layered crystal structure, wherein the content of the nickel is 30 mole percent or greater, based on a total number of moles of transition metals of the lithium transition metal oxide, wherein the conductive material includes a linear carbon conductive material, wherein the binder comprises a first binder including fluorine and a polar functional group, and a second binder, which does not include fluorine, and wherein an amount of the linear carbon conductive material is 0.1 weight percent or greater, based on a total combined weight of the cathode active material, the conductive material, and the binder.

According to an aspect of another embodiment, a lithium battery includes: the cathode; an anode; and an electrolyte located between the cathode and the anode.

Also disclosed is a method of manufacturing the cathode, the method including: providing a cathode active material including a lithium transition metal oxide, wherein the lithium transition metal oxide comprises nickel and a transition metal other than nickel, wherein a content of the nickel is 30 mole percent or greater, based on a total number of moles of transition metals of the lithium transition metal oxide, and wherein the lithium transition metal oxide has a layered crystal structure, a conductive material including a linear carbon conductive material, wherein an amount of the linear carbon conductive material is 0.1 weight percent or greater, based on a total combined weight of the cathode active material, the conductive material, and a binder including a first binder including fluorine and a polar functional group, and a second binder, which does not include fluorine; combining the cathode active material, the conductive material, a binder, and a solvent to form a composition; disposing the composition on a current collector; and removing the solvent to manufacture the cathode.

Also disclosed is a method of manufacturing a lithium battery, the method including: manufacturing a cathode using the method; disposing the cathode on a separator and an anode; and contacting the cathode, the separator, and the anode with an electrolyte to manufacture the lithium battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
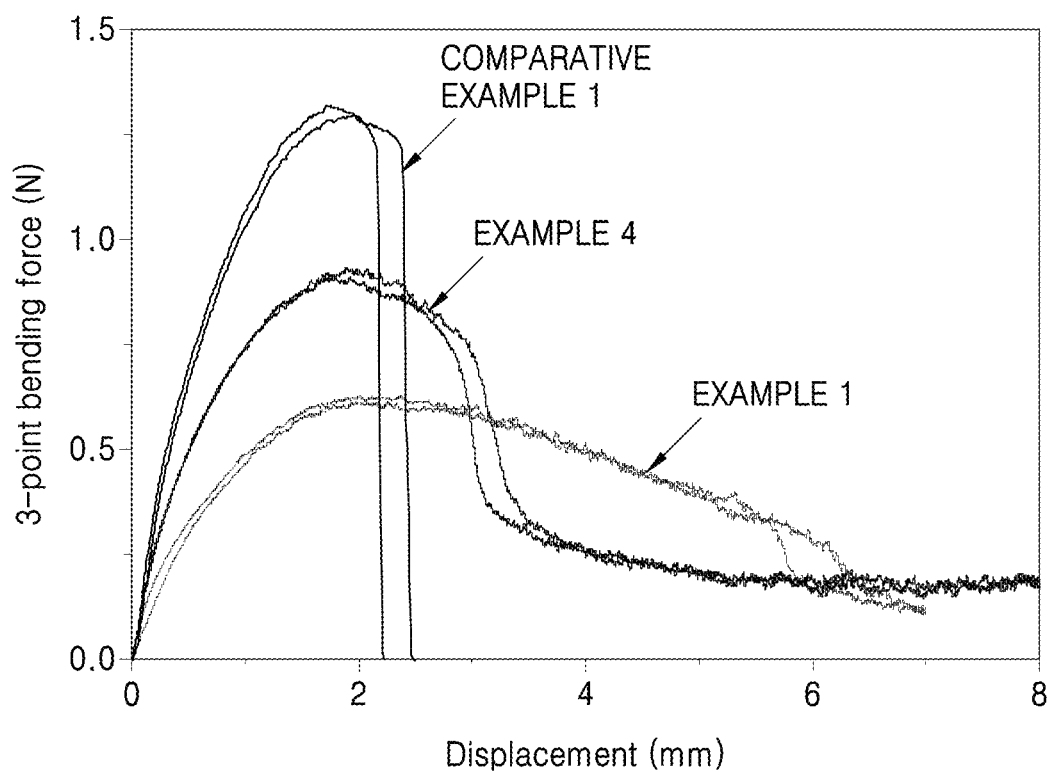
FIG. 1 is a graph of 3-point bending force (newtons, N) versus displacement (millimeters, mm) illustrating the results of a flexural property test on cathodes prepared according to Examples 1 and 4 and Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used herein are merely used to describe particular embodiments, and are not intended to limit the present disclosure. An expression used in the singular encompasses the expression of the plural, unless it has a clearly different meaning in the context. Hereinafter, it is to be understood that the terms such as "including" or "having," etc., are intended to indicate the existence of features, numbers, operations, components, parts, elements, materials, or combinations thereof disclosed in the specification, and are not intended to preclude the possibility that one or more other features, numbers, operations, components, parts, elements, materials, or combinations thereof may exist or may be added. A forward slash, i.e., "/", as used herein, may be interpreted as either "and" or "or".

In the drawings, thicknesses of layers and regions may be enlarged or reduced for clarity. Throughout the specification, like reference numerals denote like elements. Throughout the specification, it will be understood that when one element such as layer, region, or plate, is referred to as being "on" another element, it may be directly on the other element, or intervening elements may also be present therebetween. It will be understood that, although the terms first, second, etc. may be used herein to describe various components, these components should not be limited by these terms. These terms are only used to distinguish one component from another.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless defined otherwise, all terms (including technical and scientific terms) in the specification may be defined as commonly understood by one having ordinary skilled in the art. The terms defined in a generally-used dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

A C-rate is a measure of the rate at which a battery is discharged relative to its maximum capacity. A 1.0 C rate means a discharge current which will discharge the entire battery in one hour, e.g., a 1.0 C rate for a battery having a discharge capacity of 1.6 ampere-hours would be a discharge current of 1.6 amperes. A 5.0 C rate for this battery would be 8.0 amperes. A 0.5 C rate for this battery would be 0.8 amperes.

Hereinafter, a cathode and a lithium battery including the same according to example embodiments of the present disclosure will be disclosed in further detail.

A cathode, according to an embodiment, comprises a cathode active material, a conductive material, and a binder. The cathode active material comprises a lithium transition metal oxide including nickel and a transition metal other than nickel, and has a layered crystal structure, and a content of the nickel is 30 mole percent (mol %) or greater, based on a total number of moles of the transition metals, i.e., a total content of the nickel and the transition metal other than nickel in the lithium transition metal oxide. The conductive material comprises a linear carbon conductive material, and the binder include a first binder comprising fluorine and a polar functional group, and a second binder, which does not comprise fluorine. An amount of the linear carbon conductive material is 0.1 weight percent (wt %) or greater, based on a total combined weight of the cathode active material, the conductive material, and the binder.

Since the cathode includes the linear carbon conductive material in an amount of 0.1 wt % or greater, and the polar functional group-containing first binder, both adhesive strength and flexibility are improved, thereby improving cycle characteristics and energy density. In addition, the cathode may have improved dispersibility of the linear carbon conductive material by including the second binder, which does not comprise fluorine.

An aspect ratio of the linear carbon conductive material is 2 or greater. The linear carbon conductive material may include carbon nanotube (CNT), carbon nanofiber, carbon nanorod, or a combination thereof. However, the embodiment is not limited thereto, and any suitable linear carbon conductive material may be used. An aspect ratio (length to width ratio) of the linear carbon conductive material may be 2 or greater, 3 or greater, 4 or greater, 5 or greater, 10 or greater, 20 or greater, 50 or greater, or 100 or greater, e.g., about 2 to about 1,000,000, about 10 to about 100,000, or about 100 to about 10,000. When the linear carbon conductive material has such an aspect ratio, the linear carbon conductive material may be three-dimensionally dispersed in the cathode to form a conductive network, even when a low amount, e.g., about 3 wt %, based on the total combined weight of the cathode active material, the conductive material, and the binder is present, thereby improving electrical conductivity of the cathode. The linear carbon conductive material may be, for example, a carbon nanotube. Examples of the carbon nanotube may include single-walled carbon nanotube, double-walled carbon nanotube, multi-walled carbon nanotube, rope carbon nanotube, or a combination thereof. For example, the carbon nanotube may have a diameter of from about 5 nanometers (nm) to about 50 nm and a length of from about 1 micrometer (μm) to about 50 μm. The aspect ratio of the conductive material may be a ratio of a major dimension to a minor dimension of the conductive material. For example, an aspect ratio of the carbon nanotube may be a ratio of a length to a diameter of the carbon nanotube. Also, the amount of the linear carbon conductive material, included in the cathode, may be 0.1 wt % or greater, 0.3 wt % or greater, 0.5 wt % or greater, 0.7 wt % or greater, 0.9 wt % or greater, 1 wt % or greater, or 1.3 wt % or greater based on a total combined weight of the cathode active material, the conductive material, and the binder. For example, the amount of the linear carbon conductive material included in the cathode may be from about 0.1 wt % to about 5 wt %, from about 0.1 wt % to about 4 wt %, from about 0.1 wt % to about 3 wt %, from about 0.3 wt % to about 3 wt %, from about 0.5 wt % to about 3 wt %, from about 0.7 wt % to about 3 wt %, from about 0.9 wt % to about 3 wt %, from about 1 wt % to about 3 wt %, or from about 1.3 wt % to about 3 wt % based on the total combined weight of the cathode active material, the conductive material, and the binder.

An exemplary conductive material may further include a particulate carbon conductive material in addition to the linear carbon conductive material. An aspect ratio of the particulate carbon conductive material may be less than about 2, less than about 1.8, or less than about 1.5. The aspect ratio of the particulate carbon conductive material may be about 1.01 to about 2, about 1.05 to about 1.8, or about 1.1 to about 1. Examples of the particulate carbon conductive material may include carbon black, acetylene black, ketjen black, channel black, furnace black, lamp black, thermal black, natural graphite, artificial graphite, or a combination thereof. However, the embodiment is not limited thereto and any suitable particulate carbon conductive material may also be used. The particulate carbon conductive material may be, for example, carbon black. A weight ratio of the linear carbon conductive material to the particulate carbon conductive material may be from about 90:10 to about 10:90, from about 90:10 to about 50:50, from about 90:10 to about 60:40, from about 85:15 to about 60:40, or from about 80:20 to about 60:40, based on a total weight of the linear carbon and the particulate carbon. When the weight ratio of the linear carbon conductive material to the particulate carbon conductive material is within the ranges above, dispersibility of the conductive material is improved and electrical conductivity of the cathode is further improved, even when a low amount, e.g., about 5 wt %, of the conductive material is present, thereby decreasing internal resistance.

In the cathode, an amount of the conductive material may be from about 0.1 wt % to about 5 wt %, from about 0.3 wt % to about 4 wt %, from about 0.5 wt % to about 4 wt %, from about 1.0 wt % to about 4 wt %, from about 1.0 wt % to about 3 wt %, from about 1 wt % to about 2.5 wt %, or from about 1.0 wt % to about 2 wt % based on the total combined weight of the cathode active material, the conductive material, and the binder. When the cathode includes the conductive material within the range described above, the adhesive force, flexibility, and electrical conductivity of the cathode are further improved. As a result, cycle characteristics of the lithium battery including the cathode are further improved.

The first binder, comprising fluorine and a polar functional group, may include a repeating unit derived from a polar functional group-containing monomer, a repeating unit derived from vinylidene fluoride (1,1-difluoroethylene), and optionally, a repeating unit derived from a fluorine-containing monomer (other than polyvinylidene fluoride), in particular tetrafluoroethylene (tetrafluoroethene), hexafluoropropylene (hexafluoropropene), chlorotrifluoroethylene (1-chloro-1,2,2-trifluoroethene), a monomer comprising a fluorovinyl group (1-fluorovinyl, 2-fluorovinyl, or a combination thereof), a perfluoroalkyl vinyl ether ($C_nF_{2n+1}$—OCF=$CF_2$ wherein n=1-12 or 1-6), or a combination thereof.

In the first binder, the polar functional group may include a carboxylic acid group, a sulfonic acid group, a phosphoric acid group, a hydroxyl group, a salt thereof, or a combination thereof. However, the embodiment is not limited thereto, and any suitable polar function group may be used in the first binder. Among the polar functional group, for example, a carboxylic acid group or a sulfonic acid group (or a salt thereof) may be selected in terms of adhesive properties to the cathode active material and adhesive properties between a cathode active material layer and a current collector. For example, a carboxylic acid group may be selected in terms of efficiency of trapping transition metal ions eluted from the nickel-rich lithium transition metal oxide.

For example, the first binder may be a copolymer of a polar functional group-containing monomer and a vinylidene fluoride monomer; or the first binder may be a copolymer of a polar functional group-containing monomer, a vinylidene fluoride monomer, and a fluorine-containing monomer other than the vinylidene fluoride monomer as described above. Examples of the first binder may include a polar functional group-containing monomer-vinylidene fluoride copolymer, a polar functional group-containing monomer-vinylidene fluoride-hexafluoropropylene copolymer, or a polar functional group-containing monomer-vinylidene fluoride-chlorotrifluoroethylene copolymer. However, these embodiments are not limited thereto, and any suitable fluorine-containing binder comprising a polar functional group may be used. Particularly, the first binder may be a polyvinylidene fluoride (PVDF) binder including a carboxylic acid group (—COOH) (e.g., a carboxyl group) or a salt thereof.

In the first binder, an amount of the optional fluorine-containing monomer (the monomer other than the vinylidene fluoride monomer) may be, for example, 5 mol % or less, based on a total monomer content of the first binder. In the first binder, if the optional fluorine-containing monomer is present, an amount of the repeating unit derived from the fluorine-containing monomer (i.e., a combination of the vinylidene fluoride monomer and the optional fluorine-containing monomer) may be, for example, 50 mol % or greater to less than 100 mol %, 60 mol % or greater to less than 100 mol %, 70 mol % or greater to less than 100 mol %, 80 mol % or greater to less than 100 mol %, or 90 mol % or greater to less than 100 mol %, based on a total monomer content of the first binder, and remaining repeating unit may be derived from non-flourine containing monomer. In the first binder, an amount of the repeating unit derived from the fluorine-containing monomer may be, for example, 90 mol % to 99.9 mol %, based on a total monomer content of the first binder. When the first binder including the repeating unit derived from a fluorine-containing monomer is within the above range, improved chemical stability may be obtained.

Further in the first binder, an amount of the repeating unit derived from a polar functional group-containing monomer may be, for example, up to about 10 mol %, or from about 0.1 mol % to about 9 mol %, or from about 0.1 mol % to about 8 mol %, or from about 0.1 mol % to about 7 mol %, or from about 0.1 mol % to about 5 mol %. When the first binder comprising the polar functional group is within the above range, solvent resistance to an electrolyte is further improved.

In the first binder, an amount of a repeating unit derived from the vinylidene fluoride monomer may be, for example, about 50 mol % or greater, about 60 mol % or greater, about 70 mol % or greater, about 80 mol % or greater, or about 90 mol % or greater, based on a total content of the third binder, with the maximum amount being 100 mol % minus the mol % of the polar functional-group containing monomer and the optional fluorine-containing monomer (if present).

In an embodiment, a weight average molecular weight of the first binder may be 1,000,000 Daltons or greater, or from about 1,000,000 Daltons to about 2,000,000 Daltons, or from about 1,000,000 Daltons to about 1,800,000 Daltons, or from about 1,000,000 Daltons to about 1,500,000 Daltons, or from about 1,000,000 Daltons to about 1,200,000 Daltons. The weight average molecular weight of the first binder may be measured by gel permeation chromatography using a polystyrene standard. When the first binder has a weight average molecular weight within the above range, the adhesive force between the cathode active material and the current collector is further increased.

For example, an amount of the first binder may be up to about 2 wt %, or up to about 1.5 wt %, about 1 wt %, up to about 0.5 wt %, about 0.2 wt %, or up to about 0.1 wt % or less, based on the total combined weight of the cathode active material, the conductive material, and the binder. For example, the amount of the first binder may be from about 0.01 wt % to about 2 wt %, from about 0.01 wt % to about 1.5 wt %, from about 0.01 wt % to about 1.0 wt %, from about 0.01 wt % to about 0.5 wt %, from about 0.01 wt % to about 0.2 wt %, or from about 0.01 wt % to about 0.1 wt %, based on the total combined weight of the cathode active material, the conductive material, and the binder. When the cathode includes the first binder within the above range, adhesive force between the cathode active material and an electrode plate is further improved, and a lithium battery including the cathode may have improved cycle characteristics.

An exemplary embodiment of a cathode may further include a polar functional group-free, second fluorine-containing binder, i.e., a third binder, wherein the third binder comprises fluorine and wherein the third binder does not comprise the polar functional group. The third binder may comprise units derived from vinylidene fluoride. For example, the third binder may be a homopolymer of a vinylidene fluoride monomer, or a copolymer of a vinylidene fluoride monomer and tetrafluoroethylene, hexafluoropropylene, chlorotrifluoroethylene, a fluorovinyl-group containing monomer, a perfluoroalkyl vinyl ether, or a combination thereof. The alkyl group of the perfluoroalkyl vinyl ether may be a C1 to C10, or a C2 to C8 perfluorinated alkyl group. Particularly, the third binder may be a vinylidene fluoride homopolymer, a vinylidene fluoride-hexafluoropropylene copolymer, a vinylidene fluoride-chlorotrifluoroethylene copolymer, or the like. However, these embodiments are not limited thereto, and any suitable binder that comprises fluorine, and does not comprise the polar functional group, may be used for the third binder. Particularly, the third binder may be a polyvinylidene fluoride (PVDF) binder. In the third binder, an amount of a repeating unit derived from the vinylidene fluoride monomer may be, for example, about 50 mol % or greater, about 60 mol % or greater, about 70 mol % or greater, about 80 mol % or greater, or about 90 mol % or greater, based on a total content of the third binder. In an embodiment, a weight average molecular weight of the third binder may be about 1,000,000 Daltons or less, from about 100,000 Daltons to about 1,000,000 Daltons, from about 200,000 Daltons to about 900,000 Daltons, from about 300,000 Daltons to about 800,000 Daltons, from about 500,000 Daltons to about 700,000 Daltons, or from about 670,000 Daltons to about 700,000 Daltons. When the weight average molecular weight of the third binder is within the above range, dispersibility of the cathode active material is further improved in the cathode including the first binder.

For example, an amount of the third binder, which does not comprise a polar functional group, may be about 2 wt % or less, about 1.5 wt % or less, about 1 wt % or less, about 0.5 wt % or less, about 0.2 wt % or less, or about 0.1 wt % or less, based on the total combined weight of the cathode active material, the conductive material, and the binder. For example, the amount of the third binder, which does not comprise a polar functional group, may be from about 0.01 wt % to about 2 wt %, from about 0.01 wt % to about 1.5 wt %, from about 0.01 wt % to about 1.0 wt %, from about 0.01 wt % to about 0.5 wt %, from about 0.01 wt % to about 0.2 wt %, or from about 0.01 wt % to about 0.1 wt %, based on the total combined weight of the cathode active material, the conductive material, and the binder. When the cathode includes the third binder within the above range, dispersibility of the cathode active material is further improved in the cathode and cycle characteristics of a lithium battery including the cathode are further improved.

For example, a weight ratio of the first binder to the third binder, which does not comprise a polar functional group, may be from about 90:10 to about 10:90, from about 80:20 to about 20:80, from about 70:30 to about 30:70, or from about 60:40 to about 40:60, based on a total weight of the first binder and the third binder. When the weight ratio of the first binder to the third binder is within the above range, dispersibility of the cathode active material is improved and the adhesive force between the cathode active material and the electrode plate is further improved.

While not wanting to be bound by theory, it is understood that the first binder and the third binder, which does not comprise a polar functional group, maintain an appropriate viscosity when dissolved in a non-aqueous solvent to improve dispersibility of the cathode active material and provide improved adhesive force between the particles of cathode active material and between the cathode active material and the current collector, therefore improving dimensional stability of the cathode. Thus, delamination of a cathode mixture from a cathode current collector, or occurrence of cracks in the cathode mixture, is prevented during charge and discharge, and therefore a lithium battery including the cathode has improved cycle characteristics.

The second binder, which does not comprise fluorine, contained in an exemplary embodiment of a cathode, may include a cyano group. For example, the second binder including a cyano group may include a repeating unit derived from an acrylonitrile-containing monomer and a repeating unit derived from an olefin-containing monomer. For example, the acrylonitrile-containing monomer may be acrylonitrile, methacrylonitrile, or the like. The olefin-containing monomer may be 1,3-butadiene, isoprene, 2,3-dimethyl-1,3-butadiene, 1,3-pentadiene, 1,4-pentadiene, 1,4-hexadiene, ethylene, propylene, 1-butene, or the like. The second binder may be, for example, a hydrogenated binder that does not comprise (e.g., is substantially free of) any double bonds in a main chain or backbone. Particularly, the second binder may be a hydrogenated acrylonitrile-butadiene rubber (NBR). In the second binder, an amount of the repeating unit derived from an acrylonitrile-containing monomer may be, for example, from about 1 wt % to about 70 wt %, from about 2 wt % to about 50 wt %, from about 5 wt % to about 30 wt %, or from about 10 wt % to about 25 wt %, based on a total weight of the second binder. In the second binder, an amount of the repeating unit derived from an olefin-containing monomer may be, for example, from about 30 wt % to about 99 wt %, from about 50 wt % to about 98 wt %, from about 70 wt % to about 95 wt %, or from about 75 wt % to about 90 wt %, based on a total weight of the second binder. When the second binder includes the monomer comprising acrylonitrile and/or the monomer comprising an olefin within the ranges stated above, dispersibility of the linear carbon conductive material is further improved. For example, a weight average molecular weight of the second binder, which does not comprise fluorine, may be from about 100,000 Daltons to about 1,000,000 Daltons, from about 100,000 Daltons to about 800,000 Daltons, from about 100,000 Daltons to about 600,000 Daltons, from about 100,000 Daltons to about 500,000 Daltons, or from about 100,000 Daltons to about 300,000 Daltons. When the second binder has a weight average molecular weight within the above range, flexibility of the cathode is further improved. A glass transition temperature (Tg) of the second binder may be from about −40° C. to about 30° C., from about −40° C. to about 25° C., from about −40° C. to about 20° C., from about −40° C. to about 15° C., or from about −40° C. to about 5° C. When the second binder in the cathode has a glass transition temperature as stated above, an adhesive network may be more easily formed by the second binder in the cathode.

For example, an amount of the second binder, which does not comprise fluorine, may be about 2 wt % or less, from about 0.1 wt % to about 2 wt %, from about 0.1 wt % to about 1.5 wt %, from about 0.1 wt % to about 1.0 wt %, from about 0.1 wt % to about 0.7 wt %, from about 0.1 wt % to about 0.5 wt %, or from about 0.1 wt % to about 0.3 wt %, based on the total combined weight of the cathode active material, the conductive material, and the binder. When the cathode includes the second binder within the above range, flexibility and electrical conductivity of the cathode are further improved and a lithium battery including the cathode has further improved cycle characteristics.

An exemplary embodiment of a cathode may further include a fourth binder, wherein the fourth binder comprises a cyanoalkyl group and wherein the fourth binder does not comprise fluorine. Different from the second binder, in which a cyano group may be directly bound to a main chain, in the fourth binder, a cyano group may be bound to a branch of the polymer, and thus, and while not wanting to be bound by theory, it is understood that heat generated by a side reaction between the nickel-rich lithium transition metal oxide and the electrolyte may be prevented. In an embodiment, is understood that the fourth binder reduces a heating amount of the cathode and inhibits deterioration of the nickel-rich lithium transition metal oxide in the cathode. Thus, the cathode including the fourth binder has improved thermal stability. Also, a lithium battery including the cathode has improved thermal stability and cycle characteristics. Particularly, high temperature cycle characteristics of the lithium battery are improved.

For example, an amount of the fourth binder, which does not comprise fluorine, may be about 2 wt % or less, or from about 0.1 wt % to about 2 wt %, from about 0.1 wt % to about 1.5 wt %, from about 0.1 wt % to about 1.0 wt %, from about 0.1 wt % to about 0.7 wt %, from about 0.1 wt % to about 0.5 wt %, or from about 0.1 wt % to about 0.3 wt %, based on the total combined weight of the cathode active material, the conductive material, and the binder. When the cathode includes the fourth binder within the above range, thermal stability of the cathode is further improved and cycle characteristics of the lithium battery including the cathode are also further improved.

For example, the fourth binder, which does not comprise fluorine, may be a cyano polymer in which a cyanoalkyl group is bound to a hydroxyl group-containing compound. The cyano polymer may be obtained by substituting a hydroxyl group of the polymer compound represented by A-OH with a cyanoalkyl group, or binding the cyanoalkyl group to the hydroxyl group and refers to a random copolymer in which A-OH and A-O—RCN (wherein —RCN is a cyano(C1 to C10 alkyl) group) are non-uniformly bound to each other.

For example, the fourth binder may include a cyanoalkyl polyvinyl alcohol, cyanoalkyl pullulan, cyanoalkyl cellulose, cyanoalkyl hydroxyethyl cellulose, cyanoalkyl starch, cyanoalkyl dextrin, cyanoalkyl collagen, cyanoalkyl carboxymethyl cellulose, or a combination thereof. However, the embodiment is not limited thereto and any suitable cyano resin may also be used. The number of carbon atoms contained in an alkyl group R including a cyanoalkyl group may be from 1 to 10, 2 to 8, or 3 to 6.

Particularly, the fourth binder may include cyanoethyl polyvinyl alcohol, cyanoethyl pullulan, cyanoethyl cellulose, cyanoethyl hydroxyethyl cellulose, cyanoethyl starch, cyanoethyl dextrin, cyanoethyl collagen, cyanoethyl carboxymethyl cellulose, or a combination thereof.

Particularly, the fourth binder may be, for example, cyanoethyl polyvinyl alcohol represented by Formula 1.

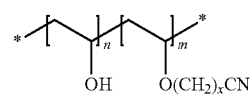

Formula 1

In Formula 1, n and m are each independently mole fractions in the repeating unit, $0 \leq n < 1$, $0 < m < 1$, $n+m=1$, and x is 2.

The second binder, comprising a cyano group, and/or the fourth binder, comprising a cyanoalkyl group, are understood to improve dispersibility of the linear carbon conductive material in the cathode, and also improve flexibility of the cathode. Thus, internal resistance of the cathode including the second binder and the fourth binder is reduced and occurrence of cracks is inhibited during a battery manufacturing process. Furthermore, internal resistance of the lithium battery including the cathode is reduced and occurrence of cracks caused during a winding process or a charging and discharging process of the lithium battery is also inhibited, thereby improving cycle characteristics of the lithium battery.

A total amount of the binder, including the first binder, the second binder, optionally the third binder, and optionally the fourth binder, may be from about 0.1 wt % to about 5 wt %, from about 0.1 wt % to about 4 wt %, from about 0.1 wt % to about 3 wt %, from about 1.0 wt % to about 2 wt %, from about 0.1 wt % to about 1.5 wt %, from about 0.1 wt % to about 1 wt %, or from about 0.1 wt % to about 0.5 wt % based on the total combined weight of the cathode active material, the conductive material, and the binder. When the cathode includes the binder within the above range, flexibility, adhesive force, and/or cycle characteristics of the cathode are further improved.

The cathode active material comprises a lithium transition metal oxide comprising nickel and a transition metal other than nickel, and has a layered crystal structure. In an embodiment the layered crystal structure is an α-NaFeO$_2$-type structure, such as that adopted by LiCoO$_2$ and LiNi$_{(1-x)}$Co$_x$O$_2$ (wherein 0<x<1).

In the lithium transition metal oxide, an amount of nickel may be, for example, about 30 mol % or greater, about 50 mol % or greater, about 60 mol % or greater, about 70 mol % or greater, about 80 mol % or greater, about 82 mol % or greater, about 85 mol % or greater, about 87 mol % or greater, or about 90 mol % or greater, based on the total number of moles of the lithium transition metal oxide. When the cathode active material includes a nickel content in the above range, discharge capacity of the cathode is further increased.

For example, the lithium transition metal oxide may be a compound represented by Formula 2.

$$Li_aNi_xCo_yM_zO_{2-b}A_b \quad\quad\quad \text{Formula 2}$$

In Formula 2, 1.05≤a≤1.2, 0≤b≤0.2, 0.3≤x<1, 0<y≤0.4, 0<z≤0.4, x+y+z=1, M is manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof, and A is F, S, Cl, Br, or a combination thereof. For example, 0.5≤x<1, 0<y≤0.4, and 0<z≤0.4. For example, 0.65≤x<1, 0<y≤0.4, and 0<z≤0.4. For example, 0.7≤x<1, 0<y≤0.3, and 0<z≤0.3. For example, 0.8≤x<1, 0<y≤0.2, and 0<z≤0.2. For example, 0.835≤x<0.97, 0<y≤0.15, and 0<z≤0.15. For example, 0.85≤x<0.95, 0<y≤0.1, and 0<z≤0.1. For example, 0.75≤x<0.99, 0<y≤0.3, and 0<z≤0.3.

For example, the lithium transition metal oxide may be a compound represented by Formula 3 or 4.

$$LiNi_xCo_yMn_zO_2 \quad\quad\quad \text{Formula 3}$$

In Formula 3 0.3≤x<1, 0<y≤0.4, and 0<z≤0.4. For example, 0.5≤x<1, 0<y≤0.4, 0<z≤0.4. For example, 0.65≤x<1, 0<y≤0.4, and 0<z≤0.4. For example, 0.7≤x<1, 0<y≤0.3, and 0<z≤0.3. For example, 0.825≤x≤0.95, 0<y≤0.15, and 0<z≤0.15. For example, 0.85≤x≤0.95, 0<y≤0.1, and 0<z≤0.1. For example, 0.8≤x<0.99, 0<y≤0.2, and 0<z≤0.1.

$$LiNi_xCo_yAl_zO_2 \quad\quad\quad \text{Formula 4}$$

In Formula 4, 0.3≤x<1, 0<y≤0.4, and 0<z≤0.4. For example, 0.5≤x<1, 0<y≤0.4, 0<z≤0.4. For example, 0.65≤x<1, 0<y≤0.4, and 0<z≤0.4. For example, 0.7≤x<1, 0<y≤0.3, and 0<z≤0.3. For example, 0.825≤x≤0.95, 0<y≤0.15, and 0<z≤0.15. For example, 0.85≤x≤0.95, 0<y≤0.1, and 0<z≤0.1. For example, 0.85≤x<0.99, 0<y≤0.2, and 0<z≤0.1.

Particularly, the lithium transition metal oxide may be LiNi$_{0.7}$Co$_{0.2}$Mn$_{0.1}$O$_2$, LiNi$_{0.88}$Co$_{0.08}$Mn$_{0.04}$O$_2$, LiNi$_{0.8}$Co$_{0.15}$Mn$_{0.05}$O$_2$, LiNi$_{0.8}$Co$_{0.1}$Mn$_{0.1}$O$_2$, LiNi$_{0.88}$Co$_{0.1}$Mn$_{0.02}$O$_2$, LiNi$_{0.8}$Co$_{0.15}$Al$_{0.05}$O$_2$, LiNi$_{0.8}$Co$_{0.1}$Al$_{0.1}$O$_2$, or LiNi$_{0.88}$Co$_{0.1}$Al$_{0.02}$O$_2$. The lithium transition metal oxide may additionally be doped with a doping element such as Al.

In an embodiment, the cathode active material may have a bimodal particle size distribution, e.g., having two or more peaks in a particle size distribution obtained by light scattering. When the lithium transition metal oxide has the bimodal particle size distribution, a mixture density of the cathode including the lithium transition metal oxide is further increased. An amount of the cathode active material may be from about 70 wt % to about 99.9 wt %, from about 80 wt % to about 99.9 wt %, from about 90 wt % to about 99.9 wt %, from about 95 wt % to about 98.9 wt %, or from about 97 wt % to about 98.9 wt %, based on the total combined weight of the cathode active material, the conductive material, and the binder. When the cathode includes the cathode active material within the above range, discharge capacity of the cathode is further increased.

Since the cathode including the linear carbon conductive material and the first binder has improved flexibility and increased adhesive force, occurrence of cracks caused by an increase in thickness of the cathode is prevented. Also, since the cathode includes the nickel-rich lithium transition metal oxide, discharge capacity is increased. Thus, the cathode may have improved cycle characteristics and a loading of about 3 milliampere-hours per square centimeter (mAh/cm$^2$) or greater, and a lithium battery including the cathode may have improved cycle characteristics and an energy density of about 500 watt-hours per liter (Wh/L) or greater. For example, the loading of the cathode may be about 3.5 mAh/cm$^2$ or greater, about 4 mAh/cm$^2$ or greater, about 4.3 mAh/cm$^2$ or greater, about 4.5 mAh/cm$^2$ or greater, about 5 mAh/cm$^2$ or greater, 5.5 mAh/cm$^2$ or greater, or about 6 mAh/cm$^2$ or greater, e.g., about 3 mAh/cm$^2$ to about 30 mAh/cm$^2$, about 3.5 mAh/cm$^2$ to about 20 mAh/cm$^2$, or about 4 mAh/cm$^2$ to about 15 mAh/cm$^2$. For example, a weight per unit area of the cathode may be about 40 milligrams per square centimeter squared (mg/cm$^2$) or greater, about 45 mg/cm$^2$ or greater, about 50 mg/cm$^2$ or greater, or about 55 mg/cm$^2$ or greater, e.g., about 40 mg/cm$^2$ to about 400 mg/cm$^2$, about 50 mg/cm$^2$ to about 350 mg/cm$^2$, or about 60 mg/cm$^2$ to about 300 mg/cm$^2$. For example, a press density of the cathode may be about 3 grams per cubic centimeter (g/cc) or greater, about 3.2 g/cc or greater, about 3.4 g/cc or greater, about 3.6 g/cc or greater, about 3.8 g/cc or greater, or about 4 g/cc or greater, e.g., about 3 g/cc to about 30 g/cc, about 4 g/cc to about 25 g/cc, or about 5 g/cc to about 20 g/cc.

In an embodiment, the cathode does not break or crack after being bent 90° or greater, 100° or greater, 110° or greater, 120° or greater, 130° or greater, 140° or greater, 150° or greater, or even after being bent to a maximum mechanical bending limit of a Universal Test Machine in a flexural property test in accordance with ASTM D790. In a flexural property test (e.g., a 3-point bending test, wherein an electrode sample having a width of 20 mm and a length of 15 mm, and interval of 10 mm between 2 points) in accordance with ASTM D790, the cathode has a maximum bending strength of about 1 newton (N) or less, about 0.9 N or less, about 0.8 N or less, about 0.7 N or less, about 0.68 N or less, about 0.66 N or less, or about 0.64 N or less, e.g., about 0.1 N to about 1 N, about 0.2 N to about 0.95 N, or about 0.3 N to about 0.9 N, against a force applied to a direction perpendicular to the sample. Since the cathode has such a low maximum bending strength, occurrence of cracks may be prevented during a winding process or a charging and discharging process of the lithium battery including the cathode. In a 180° peel strength test in accordance with ASTM D3330 (an electrode sample having a width of 25 mm), the cathode has a peel strength of about 0.3 gram-force per millimeter (gf/mm) or greater, about 1 gf/mm or greater, about 5 gf/mm or greater, about 10 gf/mm or greater, about 15 gf/mm or greater, about 20 gf/mm or greater, about 25 gf/mm or greater, or about 30 gf/mm or greater, e.g., about 0.3 gf/mm to about 300 gf/mm, about 1 gf/mm to about 250 gf/mm, or about 2 gf/mm to about 200 gf/mm. Since the cathode has such a high peel strength, i.e., increased adhesive force, delamination, cracks, and the like caused during a winding process or a charging and discharging process of the lithium battery including the cathode are prevented. In addition, the cathode does not break even after being bent, for example, 90° or greater, 100° or greater, 110° or greater, 120° or greater, 130° or greater, 140° or greater, 150° or greater, 160° or greater, or 170° or greater according to a manual finger pressing/bending test that evaluates a mechanical limit. Since the cathode has excellent flexibility, cracks caused during a winding process or a charging and discharging process of the lithium battery may be prevented. Thus, although the cathode has an increased loading, occurrence of cracks is prevented during a winding process or a charging and discharging process of the lithium battery due to improved flexibility and an increased adhesive force of the cathode.

A lithium battery according to another embodiment includes: the above-described cathode including the linear carbon conductive material and the first binder; an anode; and an electrolyte located between the cathode and the anode.

The lithium battery including the cathode including the above-described binder and linear carbon conductive material provides both increased energy density and improved cycle characteristics. For example, by using the cathode having improved cycle characteristics and a loading of about 4 mAh/cm$^2$ or greater, the lithium battery may have improved cycle characteristics and a high energy density of about 500 Wh/L or greater. For example, the energy density of the lithium battery may be about 500 Wh/L or greater, about 550 Wh/L or greater, about 600 Wh/L or greater, about 650 Wh/L or greater, about 700 Wh/L or greater, or about 800 Wh/L or greater. The lithium battery is suitable for high energy applications such as electric vehicles.

The lithium battery may include a lithium-ion battery, a lithium-ion polymer battery, and a lithium sulfur battery, also, the shape and configuration of the lithium battery is not particularly limited. The lithium battery refers to a lithium secondary battery throughout the specification unless otherwise stated. Also, the lithium battery may be an all solid battery.

For example, the lithium battery may be manufactured according to the following method, but the embodiment is not limited thereto, and any other suitable method may also be used.

First, the cathode is prepared.

A cathode active material, a conductive material, a binder, and a solvent are mixed to prepare a cathode active material composition. Subsequently, the cathode active material composition is directly coated on a cathode current collector to prepare a cathode. Alternatively, the cathode active material composition is cast on a separate support and a film separated from the support is laminated on a metal current collector to prepare a cathode.

The cathode active material used in the cathode active material composition includes the lithium transition metal oxide comprising nickel and an additional transition metal which does not comprise nickel, wherein a total amount of nickel in the lithium transition metal oxide including the nickel may be 50 mol % or greater, based on the total number of moles of the lithium transition metal oxide. For example, the nickel-rich lithium transition metal oxide may be a lithium transition metal oxide represented by Formula 1 to 3 as shown above. The conductive material used in the cathode active material composition includes a linear carbon conductive material alone, or a mixture of the linear carbon conductive material and a particulate carbon conductive material. The binder used in the cathode active material composition may include a first binder, a second binder, a third binder, and a fourth binder, as described above. The solvent used in the cathode active material composition may be N-methylpyrrolidone, acetone, or water, without being limited thereto, and any suitable solvent may be used. Also, an amount of the solvent may be from about 10 parts by weight to about 100 parts by weight, based on 100 parts by weight of the cathode active material.

For example, the cathode active material composition may be prepared by using the nickel-rich lithium transition metal oxide as the cathode active material, a mixture of carbon nanotubes and carbon black as the conductive material, a mixture of polyvinylidene fluoride (PVDF), polyvinylidene fluoride (PVDF) including a carboxylic acid group (—COOH) (e.g., carboxyl group), hydrogenated acrylonitrile-butadiene rubber (NBR), and cyanoethyl-polyvinyl alcohol (PVA-CN) as the binder, and N-methylpyrrolidone (NMP) as the solvent. For example, the cathode may be prepared by preparing a solid material including 97.7 wt % of a cathode active material, 1 wt % of a conductive material, and 1.3 wt % of a binder, and adding a solvent to the solid material such that an amount of the solvent is 70 wt % of the solid material, thus preparing a cathode active material slurry, and further coating the slurry onto a cathode current collector and drying and rolling the slurry. The amounts of the cathode active material, the conductive material, a binder, and the solvent are as described above with reference to the cathode.

A thickness of the cathode current collector is, for example, from about 3 micrometers (μm) to about 50 μm. Any suitable current collector which does not cause an undesirable chemical change in the lithium battery and has suitable conductivity may be used without limitation. For example, stainless steel, aluminum, nickel, titanium, calcined carbon, or aluminum or stainless steel surface-treated with carbon, nickel, titanium, silver, or the like may be used. The cathode current collector may have a surface on which irregularities are formed to enhance adhesive force of the current collector to the cathode active material. The cathode current collector may be used in any of various forms including films, sheets, foils, nets, porous structures, foams, and non-woven fabrics. Particularly, the cathode current collector may be an aluminum foil. A cathode of the all solid battery may further include a solid electrolyte.

Next, an anode is prepared.

An anode active material, a conductive material, a binder, and a solvent are mixed to prepare an anode active material composition. Subsequently, the anode active material composition is directly coated on an anode current collector and dried to prepare an anode. Alternatively, the anode active material composition is cast on a separate support and a film separated from the support is laminated on a metal current collector to prepare an anode.

The anode active material may include lithium metal, a metal alloyable with lithium, a transition metal oxide, a non-transition metal oxide, a carbonaceous material, or a combination thereof. However, the embodiment is not limited thereto and any suitable material for an anode active material of a lithium battery may also be used. For example, the metal alloyable with lithium may be Si, Sn, Al, Ge, Pb, Bi, Sb, an Si—Y' alloy (wherein Y' is an alkali metal, alkaline earth metal, a Group 13 to Group 16 element, a transition metal, a rare earth element, or a combination thereof (except for Si)), or an Sn—Z alloy (wherein Z is alkali metal, alkaline earth metal, a Group 13 to Group 16 element, a transition metal, a rare earth element, or a combination thereof (except for Sn)). In this regard, the elements Y' and Z may each independently be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof. For example, the transition metal oxide may be lithium titanium oxide, vanadium oxide, or lithium vanadium oxide. For example, the non-transition metal oxide may be $SnO_2$, $SiO_x(0<x<2)$, or silicon carbide (SiC). Examples of the carbonaceous material may include crystalline carbon, amorphous carbon, or a combination thereof. Examples of the crystalline carbon include natural graphite or artificial graphite that are plate, flake, spherical or fibrous form. Examples of the amorphous carbon include soft carbon (carbon sintered at low temperatures), hard carbon, meso-phase pitch carbides, sintered coke, or a combination thereof.

Examples of the binder used in the anode active material composition may include polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, polyethylene, polypropylene, polystyrene, polymethyl methacrylate, polyaniline, acrylonitrile-butadiene-styrene (ABS), phenol resin, epoxy resin, polyethylene terephthalate, polytetrafluoroethylene (PTFE), polyphenyl sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene-butadiene rubber (SBR), fluoride rubber, and a combination thereof, without being limited thereto, and any suitable binder may be used.

The conductive material, the binder, and the solvent used in the anode active material composition may be the same as those used in the cathode active material composition. The amounts of the anode active material, the conductive material, the binder and the solvent may be any suitable amount for use in the lithium battery. A plasticizer may further be added to the cathode active material composition and/or the anode active material composition to form pores inside an electrode mixture. For example, the anode may be prepared by preparing a solid material including 94 wt % of an anode active material, 3 wt % of a conductive material, and 3 wt % of a binder, and adding a solvent to the solid material such that an amount of the solvent is 70 wt % of the solid material, thus preparing an anode active material slurry, and further coating the slurry onto an anode current collector and drying and rolling the slurry.

A thickness of the anode current collector is, for example, from about 3 μm to about 500 μm. Any current collector which does not cause undesirable chemical changes in the lithium battery and has high conductivity may be used without limitation. For example, copper, stainless steel, aluminum, nickel, calcined carbon, or copper or stainless steel surface-treated with carbon, nickel, titanium, silver, or the like may be used. The anode current collector may have a surface on which irregularities are formed to enhance adhesive force of the current collector to the anode active material. The anode current collector may be used in any of various forms including films, sheets, foils, nets, porous structures, foams, and non-woven fabrics. Particularly, the anode current collector may be a copper foil. An anode of the all solid battery may further include a solid electrolyte.

Next, a separator to be inserted between the cathode and the anode is prepared.

Any suitable separator for lithium batteries may be used. Any suitable separator having low resistance to migration of ions of the electrolyte and excellent electrolyte-retaining ability may be used. Examples of the separator may include glass fiber, polyester, Teflon, polyethylene, polypropylene, polytetrafluoroethylene (PTFE), and a combination thereof, each of which may be a non-woven or woven fabric. For example, a windable separator, including polyethylene or polypropylene, may be used in lithium ion batteries and a separator having excellent electrolyte-retaining capability may be used in lithium-ion polymer batteries.

For example, the separator may be prepared according to the following method.

A polymer resin, a filler, and a solvent may be mixed to prepare a separator composition. Then, the separator composition may be directly coated on an electrode, and then dried to form a separator. Alternatively, the separator composition may be cast on a support and then dried to form a separator film, and the separator film, separated from the support, may be laminated on an electrode to form the separator. The polymer resin used to manufacture the separator is not particularly limited and may be any suitable material for use as a binder for electrodes. Examples of the polymer resin used to prepare the separator may include a vinylidene fluoride/hexafluoropropylene copolymer, PVDF, polyacrylonitrile, polymethyl methacrylate, and any mixture thereof.

Subsequently, an electrolyte located between the cathode and the anode is prepared.

For example, the electrolyte may be an organic electrolyte. For example, the organic electrolyte may be prepared by dissolving a lithium salt in an organic solvent. For example, the organic solvent may be any organic solvent commonly used in the art. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-i, γ-butyrolactone, dioxolane, 4-methyldioxolane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and any mixture thereof. The lithium salt may be any lithium salt commonly used in the art. For example, the lithium salt is $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)$ $(C_yF_{2y+1}SO_2)$ (wherein x and y are natural numbers), LiCl, LiI, or any mixture thereof.

Another exemplary electrolyte further includes a non-aqueous electrolyte, an organic solid electrolyte, an inorganic solid electrolyte, or the like in addition to the organic electrolyte described above. Examples of the organic solid electrolyte include polyethylene derivatives, polyethylene oxide derivatives, polypropylene oxide derivatives, phosphoric acid ester polymers, polyester sulfide, polyvinyl alcohol, polyvinylidene fluoride, and polymers including ionic dissociation groups. Examples of the inorganic solid electrolyte include nitride solid electrolytes, oxynitride solid electrolytes, and sulfide solid electrolytes. Examples of the inorganic solid include $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

Figure 5:
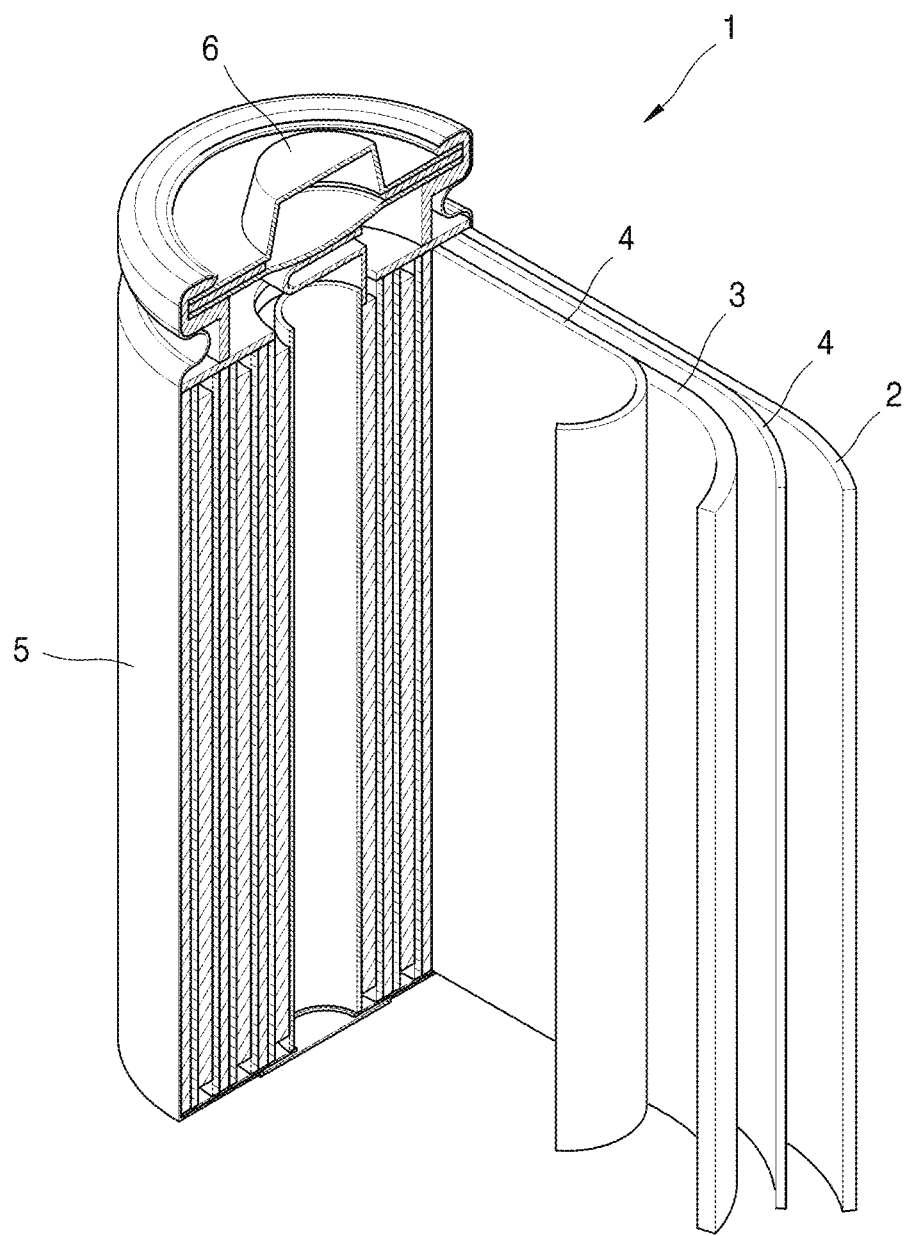
FIG. 5 is schematic diagram of an embodiment of a lithium battery.

Referring to FIG. 5, an exemplary lithium battery 1 includes a cathode 3, an anode 2, and a separator 4. The cathode 3, the anode 2, and the separator 4 are wound or folded and then accommodated in a battery case 5. Subsequently, an electrolyte is injected into the battery case 5 and the battery case 5 is sealed by a cap assembly 6, thereby completing the manufacture of the lithium battery 1. The battery case 5 may have a cylindrical shape, a rectangular shape, or a thin-film shape. Although not shown in the drawing, another exemplary lithium battery may be manufactured by using a battery assembly prepared by locating a separator between a cathode and an anode. The battery assembly is stacked in a bi-cell structure and impregnated in an organic electrolyte, and then the obtained resultant is accommodated in a pouch and sealed to complete the manufacture of a lithium-ion polymer battery. Also, a plurality of battery assemblies is stacked to form a battery pack and the battery pack may be used in any high capacity and high output device application. For example, the battery pack may be used in notebook computers, smart phones, and electric vehicles. The lithium battery may also be used in power tools that operate upon receiving power from a battery-powered motor; electric vehicles (EVs) such as hybrid electric vehicles (HEVs), and plug-in hybrid electric vehicles (PHEVs); electric motorcycles such as E-bikes and E-scooters; electric golf carts; and systems for power storage, without being limited thereto.

Throughout the specification, the term "alkyl" refers to completely saturated, branched or unbranched (or straight-chain or linear) hydrocarbons.

Examples of the "alkyl" may include, but are not limited to, methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the "alkyl" may be substituted with a halogen atom, a C1-C20 alkyl group substituted with a halogen atom (e.g.: $CCF_3$, $CHCF_2$, $CH_2F$, and $CCl_3$), a C1-C20 alkoxy group, a C2-C20 alkoxyalkyl group, a hydroxyl group, a nitro group, a cyano group, an amino group, an amidino group, a hydrazine group, a hydrazone group, a carboxylic acid group and a salt thereof, a sulfonyl group, a sulfamoyl group, a sulfonic acid group and a salt thereof, a phosphoric acid group and a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen" includes fluorine, bromine, chlorine, and iodine. The term "cyano" refers to —CN. The term "cyanoalkyl" refers to —R—CN, where R is "alkyl".

Hereinafter, one or more embodiments of the present disclosure will be described in detail with reference to the following examples. These examples are not intended to limit the purpose and scope of the one or more embodiments of the present disclosure.

EXAMPLES

Preparation of Cathode and Lithium Battery

Comparative Example 1

96 wt % of nickel cobalt manganese oxide (NCM), 2 wt % of carbon black (CB), 0.2 wt % of modified PVDF (m-PVDF), 1.6 wt % of PVDF, and 0.2 wt % of NBR, without CNT (weight ratio of Active material:Conductive material:Binder=96:2:2)

Particulate carbon black having an aspect ratio less than 2 (KETJENBLACK ECP, EC300J, AkzoNobel), as a conductive material, was added to a first solution containing a second binder (a non-fluorine-containing binder) (NBR, where the first binder solution was prepared by dispersing a hydrogenated acrylonitrile-butadiene binder in NMP, BM-720H, weight average molecular weight=300,000 grams per mole (g/mol), Tg=−30° C., Nippon Zeon Co. Ltd., Japan), and the carbon black-containing mixture was stirred several times at 2000 revolutions per minute (rpm) for 10 minutes using a Planetary centrifugal mixer (hereinafter, referred to as Thinky mixer, Thinky Corporation, USA) to prepare a conductive material slurry.

A second solution including a first binder (a fluorine- and polar group-containing binder) (m-PVDF, modified PVDF including carboxyl groups (—COOH), SOLEF 5130, weight average molecular weight=1,000,000 g/mol, Solvay, Belgium) and $LiNi_{0.88}Co_{0.08}Mn_{0.04}O_2$, as a cathode active material, were added to the conductive material slurry, and the mixture was stirred at 1000 rpm for 5 minutes using the Thinky mixer to prepare a first active material slurry.

A third solution containing a third binder (a fluorine-containing, polar group-free binder) (PVDF, SOLEF 6020, weight average molecular weight=700,000 g/mol, Solvay, Belgium) was added to the first active material slurry, and the mixture was stirred at 1000 rpm for 5 minutes using the Thinky mixer to prepare a second active material slurry.

The second active material slurry was coated on a 12 μm-thick aluminum foil, dried at 110° C. for 2 hours, and rolled to prepare a cathode plate having a loading (or capacity per unit area) of 6.0 mAh/cm$^2$ and a mixture density of 3.6 g/cc.

A weight ratio of the cathode active material, the conductive material, and the binder included in the cathode was 96:2:2, and a weight ratio of the first, polar group- and fluorine-containing binder (m-PVDF), the third, non-polar group- and fluorine-containing binder (PVDF), and the second, non-fluorine-containing binder (NBR) included in the binder was 0.2:1.6:0.2.

Carbon nanotubes were not used. An amount of the first binder (m-PVDF) was 0.2 wt %, based on the total combined weight of the cathode active material, the conductive material, and the binder.

A coin cell (CR2032 type) was prepared using the cathode plate. In the preparation of the coin cell, Li metal was used as a counter electrode, a polyethylene separator (separator, Star® 20) having a thickness of 20 μm was used, and an electrolyte prepared by dissolving 0.5 wt % of vinylene carbonate (VC) to a mixed solvent of fluoroethylene carbonate (FEC):ethylene carbonate (EC):ethylmethyl carbonate (EMC):dimethyl carbonate (DMC) mixed in a volume ratio of 7:7:46:40 was used, and 1.15 M LiPF$_6$ in the solvent.

Comparative Example 2

95 wt %, of NCM, 2.5 wt % of CB, 2.5 wt % of PVDF, without NBR (weight ratio of Active material:Conductive material:Binder=95:2.5:2.5)

A cathode plate was prepared in the same manner as in Comparative Example 2, except that the weight ratio of the cathode active material, the conductive material, and the binder included in the cathode was 95:2.5:2.5, and the weight ratio of the first binder (m-PVDF), the third binder (PVDF), and the second binder (NBR) included in the binder was 0:2.5:0.

Carbon nanotubes were not used. The first binder was not used.

A coin cell was prepared in the same manner as in Comparative Example 1.

Comparative Example 3

97.7 wt % of NCM, 1.86 wt % of CNT+CB, 0.1 wt % of PVDF, and 0.34 wt % of NBR, 1.3% of CNT, without m-PVDF (weight ratio of Active material:Conductive material:Binder=97.7:1.86:0.44)

A cathode plate was prepared in the same manner as in Comparative Example 1, except that the weight ratio of the cathode active material, the conductive material, and the binder included in the cathode was 97.7:1.86:0.44, and the weight ratio of the first binder (m-PVDF), the third binder (PVDF), and the second binder (NBR) included in the binder was 0.0:0.1:0.34.

The amount of CNT was 1.3 wt %, based on the total combined weight of the cathode active material, the conductive material, and the binder. The first binder was not used.

A coin cell was prepared in the same manner as in Comparative Example 1.

Example 1

97.7 wt % of NCM, 1.86 wt % of CNT+CB, 0.1 wt % of m-PVDF, and 0.34 wt % of NBR, 1.3 wt % of CNT (weight ratio of Active material:Conductive material:Binder=97.7:1.86:0.44)

A cathode plate was prepared in the same manner as in Comparative Example 1, except that the weight ratio of the cathode active material, the conductive material, and the binder included in the cathode was 97.7:1.86:0.44, and the weight ratio of the first binder (m-PVDF), the third binder (PVDF), and the second binder (NBR) included in the binder was 0.1:0.0:0.34.

The amount of CNT was 1.3 wt %, based on the total combined weight of the cathode active material, the conductive material, and the binder. The amount of the first binder was 0.1 wt %, based on the total combined weight of the cathode active material, the conductive material, and the binder.

A coin cell was prepared in the same manner as in Comparative Example 1.

Example 2

97.7 wt % of NCM, 1.86 wt % of CNT+CB, 0.05 wt % of m-PVDF, 0.05 wt % of PVDF, and 0.34 wt % of NBR, 1.3 wt % of CNT (weight ratio of Active material:Conductive material:Binder=97.7:1.86:0.44)

A cathode plate was prepared in the same manner as in Comparative Example 1, except that the weight ratio of the cathode active material, the conductive material, and the binder included in the cathode was 97.7:1.86:0.44, and the weight ratio of the first binder (m-PVDF), the third binder (PVDF), and the second binder (NBR) included in the binder was 0.05:0.05:0.34.

The amount of CNT was 1.3 wt %, based on the total combined weight of the cathode active material, the conductive material, and the binder. The amount of the first binder was 0.05 wt %, based on the total combined weight of the cathode active material, the conductive material, and the binder.

A coin cell was prepared in the same manner as in Comparative Example 1.

Example 3

97.7 wt % of NCM, 1.0 wt % of CNT+CB, 0.2 wt % of m-PVDF, 0.9 wt % of PVDF, and 0.2 wt % of NBR, 0.7 wt % of CNT (weight ratio of Active material:Conductive material:Binder=97.7:1.0:1.3)

A cathode plate was prepared in the same manner as in Comparative Example 1, except that a mixture of linear carbon nanotubes having an aspect ratio of 10 or greater and particulate carbon black having an aspect ratio less than 2 (Ketjen black ECP, EC300J, AkzoNobel), mixed in a weight ratio of 7:3, was used as the conductive material instead of carbon black alone and the weight ratio of the cathode active material, the conductive material, and the binder included in the cathode was 97.7:1:1.3, and the weight ratio of the first binder (m-PVDF), the third binder (PVDF), and the second binder (NBR) included in the binder was 0.2:0.9:0.2.

The amount of CNT was 0.7 wt %. The amount of the first binder was 0.2 wt %, based on the total combined weight of the cathode active material, the conductive material, and the binder.

A coin cell was prepared in the same manner as in Comparative Example 1.

Example 4

97.7 wt % of NCM, 1.3 wt % of CNT+CB, 0.2 wt % of m-PVDF, 0.54 wt % of PVDF, and 0.26 wt % of NBR, 0.9 wt % of CNT (weight ratio of Active material:Conductive material:Binder=97.7:1.3:1.0)

A cathode plate was prepared in the same manner as in Comparative Example 1, except that the weight ratio of the cathode active material, the conductive material, and the binder included in the cathode was 97.7:1.3:1, and the weight ratio of the first binder (m-PVDF), the third binder (PVDF), and the second binder (NBR) included in the binder was 0.2:0.54:0.26.

The amount of CNT was 0.9 wt %, based on the total combined weight of the cathode active material, the conductive material, and the binder. The amount of the first binder was 0.2 wt %, based on the total combined weight of the cathode active material, the conductive material, and the binder.

A coin cell was prepared in the same manner as in Comparative Example 1.

Example 5

97.7 wt % of NCM, 1.57 wt % of CNT+CB, 0.2 wt % of m-PVDF, 0.22 wt % of PVDF, and 0.31 wt % of NBR, 1.1 wt % of CNT (weight ratio of Active material:Conductive material:Binder=97.7:1.57:0.73)

A cathode plate was prepared in the same manner as in Comparative Example 1, except that the weight ratio of the cathode active material, the conductive material, and the binder included in the cathode was 97.7:1.57:0.73, and the weight ratio of the first binder (m-PVDF), the third binder (PVDF), and the second binder (NBR) included in the binder was 0.2:0.22:0.31.

The amount of CNT was 1.1 wt %, based on the total combined weight of the cathode active material, the conductive material, and the binder. The amount of the first binder was 0.2 wt %, based on the total combined weight of the cathode active material, the conductive material, and the binder.

A coin cell was prepared in the same manner as in Comparative Example 1.

Evaluation Example 1: Evaluation of Peel Strength

Peel strengths of the cathode plates prepared according to Examples 1, 3 and 4 and Comparative Example 1 were evaluated in accordance with ASTM D3330. A UTM, Instron 3345 was used as a device for measurements.

Each of the cathode plates in which active material layers were located on both surfaces of the current collectors prepared according to Examples 1, 3, and 4 and Comparative Example 1 was cut to a size of 25 mm×150 mm and 20 samples of each cathode plate were prepared. After an adhesive was coated on a glass substrate at room temperature, the cathode plate was adhered to the adhesive and roll-pressed. After one end of the cathode plate was folded 180 degrees, a force applied to the sample was measured while pulling the sample in a direction opposite to the one end at a speed of 100 mm/min. Evaluation results are shown in Table 1 below. A break occurrence rate is the number of samples where the cathode active material layer located on one surface of the cathode plate not in contact with the adhesive breaks during the process of folding the cathode plate 180 degrees among the total number of samples expressed as a percentage. The peel strength is an average of 20 samples.

TABLE 1

|  | Peel strength [gf/mm] | Break occurrence rate [%] |
| --- | --- | --- |
| Example 1 | 30.32 | 0 |
| Example 3 | 0.44 | 90 |
| Example 4 | 1.35 | 35 |
| Comparative Example 1 | 0.0 | 100 |

As shown in Table 1, the peel strengths of the cathodes prepared according to Examples 1, 3, and 4 are greater than that of the cathode prepared according to Comparative Example 1.

Thus, although the cathodes prepared according to Examples 1, 3, and 4 include lower amounts of the binder than that of the cathode prepared according to Comparative Example 1, it was confirmed that the cathode active material layers had far greater peel strengths, the current collectors had better adhesive forces, and/or the cathode active material layer had better cohesive forces than the cathode of Comparative Example 1.

Also, while the cathode active material layer of Comparative Example 1 had a break occurrence rate of 100%, the cathode active material layers of Examples 1, 3 and 4 had fewer break occurrence rates of 90% or less and the cathode active material layer of Example 1 did not break.

Thus, it was confirmed that the cathodes of Examples 1, 3 and 4 had better flexibility than the cathode of Comparative Example 1 despite lower binder contents.

Evaluation Example 2: Evaluation of Bending Strength

Bending strengths (3-point bending test) of the cathode plates prepared according to Examples 1, 3, 4 and Comparative Example 1 were measured in accordance with ASTM D790.

Each of the cathode plates prepared according to Examples 1, 3, and 4 and Comparative Example 1 was cut to a size of 15 mm×20 mm. According to the 3-point bending test, each sample was located between first and second points spaced apart at an interval of 10 mm, and a center of the sample (third point) was pressed at a constant speed in a thickness direction of the sample using a probe to evaluate bending properties thereof. A force applied to the sample was measured while moving at a speed of 5 mm/min in the thickness direction. Measurement results are shown in Table 2 and FIGS. 1 and 2. A maximum bending force (maximum bending strength) is a maximum force applied to the sample with respect to a moving distance of the probe.

TABLE 2

|  | Maximum bending force [N] |
| --- | --- |
| Example 1 | 0.62 |
| Example 3 | 0.85 |
| Example 4 | 0.95 |
| Comparative Example 1 | 1.3 |

As shown in Table 2 and FIG. 1, the maximum bending forces of the cathodes according to Examples 1, 3, and 4 were lower than that of the cathode according to Comparative Example 1.

As shown in FIG. 1, although the maximum bending force of the cathode according to Example 1 was lower than that of the cathode according to Example 4, a slope of the cathode according to Example 1 was gentler than that of the cathode according to Example 4.

Thus, it was confirmed that the cathodes according to Examples 1, 3, and 4 had better flexibility than the cathode according to Comparative Example 1 despite lower binder contents.

Figure 2:
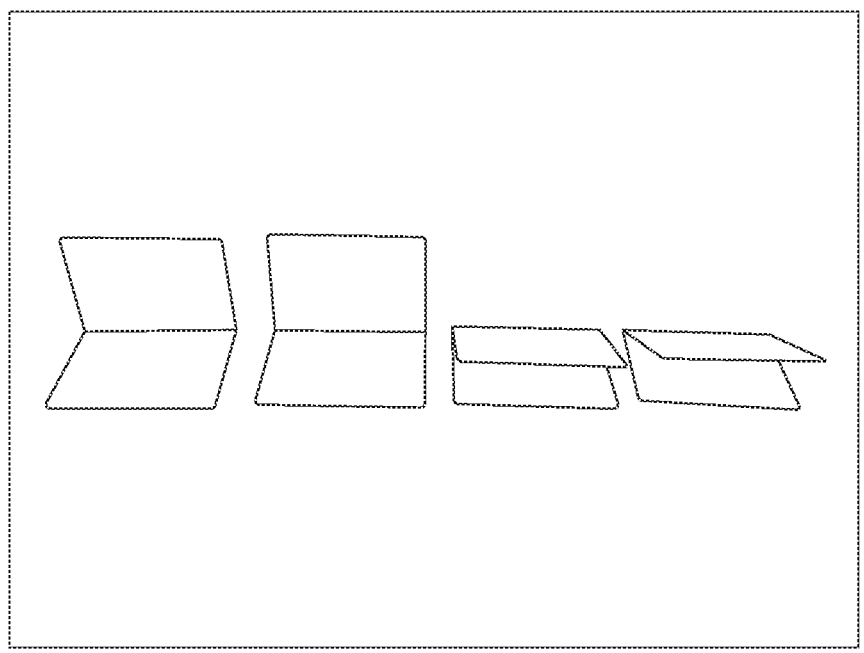
FIG. 2 is a photograph illustrating bending properties of a cathode prepared according to Example 1.

In addition, as shown in FIG. 2, the cathode according to Example 1 did not break but remained bent after the bending test even after finger-pressing to a large bending/bending angle (two left samples: 90 degrees and two right samples: 180 degrees).

Evaluation Example 3: Evaluation of Impedance

The lithium batteries prepared according to Examples 1, 3, and 5, and Comparative Example 2 were charged with a constant current of 0.2 C rate at 25° C. until a voltage reached 4.35 volts (V) (vs. Li), and then while maintaining the voltage of 4.35 V in a constant voltage mode, the charging process was cut off at a current of 0.05 C. Subsequently, the lithium batteries were discharged with a constant current of 0.2 C until the voltage reached 2.8 V (vs. Li) (Formation operation).

The lithium batteries having gone through the formation operation were charged with a constant current of 0.5 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.5 C until the voltage reached 2.8 V (vs. Li) (1$^{st}$ cycle). This charging/discharging cycle was repeated 50 times. The lithium batteries were rested for 20 minutes after every charging/discharging cycle.

After the 50 cycles of charging/discharging cycles were terminated, the lithium batteries were charged with a constant current of 0.5 C at 45° C. until the voltages reached 4.35 V (vs. Li), and then while maintaining the voltage of 4.35 V in a constant voltage mode, the charging process was cut off at a current of 0.05 C, thereby completing the charging process.

Impedance of each of the charged lithium batteries was measured using an impedance analyzer (Biologic VMP3, Potentio Electrochemical Impedance Spectroscopy). The measurement was performed using an alternating current with an amplitude of 10 mV in a frequency range of from about 1 megahertz (MHz) to about 100 mHz. Interfacial resistance in ohms (ohm) was measured from an obtained Nyquist plot and the results are shown in Table 3 below.

TABLE 3

|  | Interfacial resistance [ohm] |
| --- | --- |
| Example 1 | 4.90 |
| Example 3 | 6.52 |
| Example 5 | 6.48 |
| Comparative Example 2 | 6.94 |

As shown in Table 3, the lithium batteries including the cathodes according to Examples 1, 3, and 5 had lower impedance than the lithium battery including the cathode according to Comparative Example 2.

That is, since the cathodes according to Example 1, 3, and 5 include 0.1 wt % or more of the linear carbon conductive material, interfacial resistance was considerably reduced.

Evaluation Example 4: Evaluation of Charging/Discharging Characteristics (Room Temperature of 25° C.), with CNT Content The lithium batteries prepared according to Example 1 and Comparative Example 2 were charged with a constant current of 0.2 C at 25° C. until a voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.2 C until the voltage reached 2.8 V (vs. Li) (Formation operation).

The lithium batteries having gone through the formation operation were charged with a constant current of 0.5 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.5 C until the voltage reached 2.8 V (vs. Li) ($1^{st}$ cycle). This charging/discharging cycle was repeated 50 times. The lithium batteries were rested for 20 minutes after every charging/discharging cycle.

Charging/discharging test results are shown in Table 4 below and FIG. 3. A capacity retention at the $50^{th}$ cycle is defined as Equation 1 below.

Capacity retention=[Discharge capacity at $50^{th}$ cycle/ Discharge capacity at $1^{st}$ cycle]×100%   Equation 1

TABLE 4

|  | CNT content [wt %] | Capacity retention [%] |
| --- | --- | --- |
| Example 1 | 1.3 | 92 |
| Comparative Example 2 | 0 | 3.2 |

Figure 3:
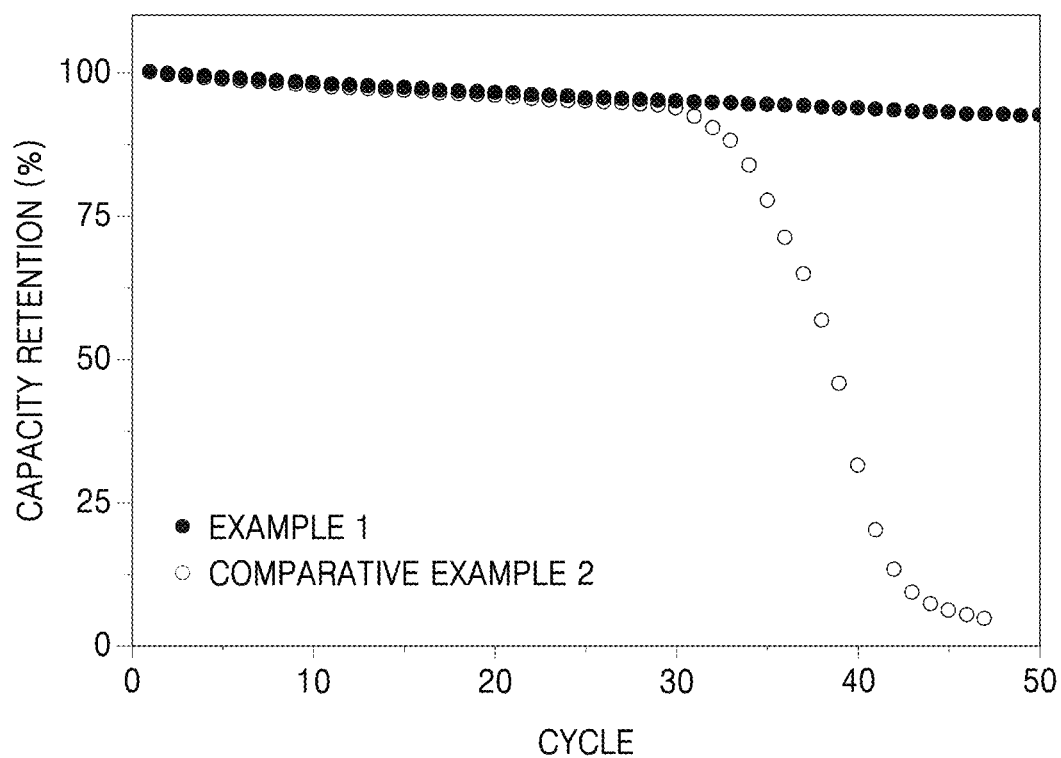
FIG. 3 is a graph of capacity retention (percent, %) versus cycle illustrating the results of evaluation of lifespan characteristics at room temperature of cathodes prepared according to Example 1 and Comparative Example 2.

As shown in Table 4 and FIG. 3, lifespan characteristics of the lithium battery according to Example 1, having an improved energy density due to inclusion of the cathode having a loading of 6 mAh/cm², were considerably improved at room temperature in comparison with the lithium battery according to Comparative Example 2.

Although the lithium battery according to Comparative Example 2 exhibited similar capacity retention to those of the lithium battery according to Example 1 up to about 30 cycles, the capacity retention rapidly decreased after about 30 cycles.

Thus, it was confirmed that when the amount of the linear carbon conductive material was less than 0.1 wt % in the cathode, lifespan characteristics at room temperature rapidly deteriorate.

Evaluation Example 5: Evaluation of Charging/Discharging Characteristics (Room Temperature of 25° C.),—with m-PVDF Content The lithium batteries prepared according to Examples 1 and 2 and Comparative Example 3 were charged with a constant current of 0.2 C at 25° C. until a voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.2 C until the voltage reached 2.8 V (vs. Li) (Formation operation).

The lithium batteries having gone through the formation operation were charged with a constant current of 0.5 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.5 C until the voltage reached 2.8 V (vs. Li) ($1^{st}$ cycle). This charging/discharging cycle was repeated 50 times. The lithium batteries were rested for 20 minutes after every charging/discharging cycle.

Charging/discharging test results are shown in Table 5 below and FIG. 4. A capacity retention at the $50^{th}$ cycle is defined as Equation 2 below.

Capacity retention=[Discharge capacity at $50^{th}$ cycle/ Discharge capacity at $1^{st}$ cycle]×100%   Equation 2

TABLE 5

|  | m-PVDF content [wt %] | Capacity retention [%] |
| --- | --- | --- |
| Example 1 | 0.1 | 92 |
| Example 2 | 0.05 | 92 |
| Comparative Example 3 | 0.0 | 3 |

Figure 4:
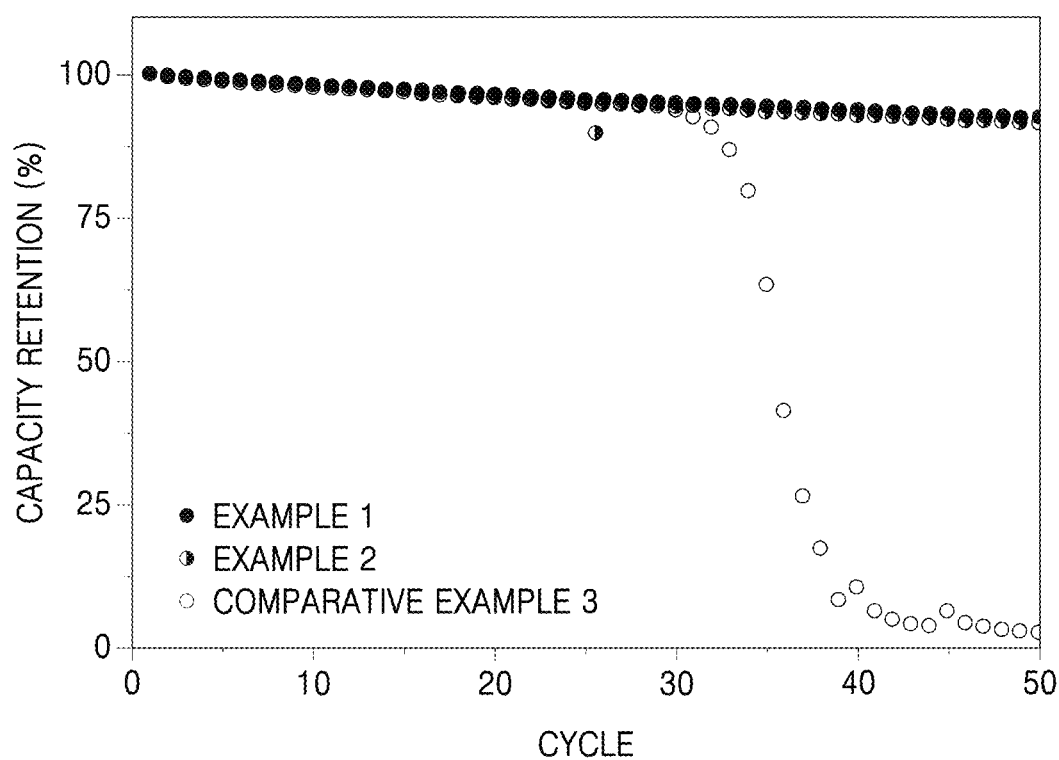
FIG. 4 is a graph of capacity retention (percent, %) versus cycle illustrating the results of evaluation of lifespan characteristics at room temperature of cathodes prepared according to Examples 1 and 2 and Comparative Example 3.

As shown in Table 5 and FIG. 4, lifespan characteristics of the lithium batteries according to Examples 1 and 2, due to inclusion of the cathode having a loading of 6 mAh/cm², were considerably improved at room temperature in comparison with the lithium battery according to Comparative Example 3.

Although the lithium battery according to Comparative Example 3 exhibited similar capacity retention to those of the lithium batteries according to Examples 1 and 2 up to about 30 cycles, the capacity retention rapidly decreased after about 30 cycles.

Thus, it was confirmed that when the cathode did not include the polar functional group-containing first fluorine-based binder, lifespan characteristics at room temperature rapidly deteriorated.

Evaluation Example 6: Evaluation of High Rate Properties at Room Temperature

The lithium batteries prepared according to Examples 1 and 3 and Comparative Example 1 were charged with a constant current of 0.1 C at 25° C. until a voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.1 C until the voltage reached 2.8 V (vs. Li) (1st cycle, Formation operation).

The lithium batteries having gone through the 1st cycle were charged with a constant current of 0.2 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.2 C until the voltage reached 2.8 V (vs. Li) (2nd cycle).

The lithium batteries having gone through the 2nd cycle were charged with a constant current of 0.2 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.5 C until the voltage reached 2.8 V (vs. Li) (3rd cycle).

The lithium batteries having gone through the 3rd cycle were charged with a constant current of 0.2 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 1.0 C until the voltage reached 2.8 V (vs. Li) (4th cycle).

The lithium batteries having gone through the 4th cycle were charged with a constant current of 0.2 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 2.0 C until the voltage reached 2.8 V (vs. Li) (5th cycle).

The lithium batteries having gone through the 5th cycle were charged with a constant current of 0.2 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 3.0 C until the voltage reached 2.8 V (vs. Li) (6th cycle).

The lithium batteries having gone through the 6th cycle were charged with a constant current of 0.2 C at 25° C. until the voltage reached 4.35 V (vs. Li), and then while maintaining the voltage of 4.35 V in a constant voltage mode, the charging process was cut off at a current of 0.05 C. Subsequently, the lithium batteries were discharged with a constant current of 0.5 C until the voltage reached 2.8 V (vs. Li) (7th cycle).

The lithium batteries were rested for 20 minutes after every charging/discharging cycle.

Charging/discharging test results are shown in Table 6 below. High rate properties are defined Equations 3 and 4 below, respectively.

2 C high rate property [%]=[discharge capacity of 5th cycle (2 Crate)/discharge capacity of 2nd cycle (0.2 C rate)]×100%     Equation 3

3 C high rate property [%]=[discharge capacity of 6th cycle (3 C)/discharge capacity of 2nd cycle (0.2 C rate)]×100%     Equation 4

TABLE 6

|  | CNT content [wt %] | 2 C high rate property [%] | 3 C high rate property [%] |
| --- | --- | --- | --- |
| Example 1 | 1.3 | 86.5 | 62.3 |
| Example 3 | 0.7 | 75.8 | 46.8 |

As shown in Table 6, the lithium batteries including 0.1 wt % or more of the linear carbon conductive material according to Examples 1 and 3 had good high rate properties. Further, Examples 1 and 3 had enhanced high rate properties in comparison with the lithium battery not including the linear carbon conductive material according to Comparative Example 1 which is not shown in Table 6.

Also, the lithium battery including 1.0 wt % or more of the linear carbon conductive material according to Example 1 had significantly improved high rate properties in comparison with the lithium battery having a low amount of the linear carbon conductive material according to Example 3.

In addition, although not shown in the drawings, the lithium battery not including the linear carbon conductive material according to Comparative Example 1 had poorer cycle characteristics than the lithium batteries according to Examples 1 and 3.

According to an embodiment, the cathode may have improved flexibility and improved adhesive force due to inclusion of the first binder and the linear carbon conductive material.

According to another embodiment, the lithium battery may have improved lifespan characteristics due to inclusion of the cathode having improved flexibility and improved adhesive force.

According to another embodiment, the lithium battery may have improved energy density through inclusion of the cathode having improved flexibility and improved adhesive force, and inclusion of the nickel-rich lithium transition metal oxide, and having the increased loading.

It should be understood that embodiments described herein should be considered in a descriptive sense only and not for purposes of limitation. Descriptions of features or aspects within each embodiment should typically be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:
1. A cathode, the cathode comprising:
a cathode active material comprising a lithium transition metal oxide;
a conductive material; and
a binder,
wherein the lithium transition metal oxide comprises nickel and a transition metal other than nickel,
wherein the lithium transition metal oxide has a layered crystal structure,
wherein a content of the nickel is equal to or greater than 30 mole percent to less than 100 mole percent, based on a total number of moles of transition metals of the lithium transition metal oxide,
wherein the conductive material comprises a linear carbon conductive material, wherein the binder comprises
a first binder comprising fluorine and a polar functional group consisting of a carboxylic acid group, a sulfonic acid group, a phosphoric acid group, a hydroxyl group, a salt thereof, or a combination thereof, and a second binder, which does not comprise fluorine, and
wherein an amount of the linear carbon conductive material is 0.1 weight percent to 5 weight percent, and an amount of the first binder is 0.01 weight percent to 1 weight percent, each based on a total combined weight of the cathode active material, the conductive material, and the binder,.
wherein the amount of the second binder is greater than the amount of the first binder.

2. The cathode of claim 1, wherein the linear carbon conductive material comprises carbon nanotube, carbon nanofiber, carbon nanorod, or a combination thereof.

3. The cathode of claim 1, wherein the conductive material further comprises a particulate carbon conductive material in addition to the linear carbon conductive material,
wherein an aspect ratio of the linear carbon conductive material is 2 or greater, and
wherein an aspect ratio of the particulate carbon conductive material is less than 2.

4. The cathode of claim 3, wherein the particulate carbon conductive material comprises carbon black, acetylene black, ketjen black, channel black, furnace black, lamp black, thermal black, natural graphite, artificial graphite, or a combination thereof.

5. The cathode of claim 3, wherein a weight ratio of the linear carbon conductive material to the particulate carbon conductive material is from about 90:10 to about 10:90.

6. The cathode of claim 1, wherein an amount of the first binder is 0.01 to 0.5 weight percent, based on the total combined weight of the cathode active material, the conductive material, and the binder.

7. The cathode of claim 1, wherein the first binder comprises:
a repeating unit comprising a polar functional group;
a repeating unit derived from vinylidene fluoride; and
optionally, a repeating unit derived from tetrafluoroethylene, hexafluoropropylene, chlorotrifluoroethylene, a fluorovinyl group-containing monomer, a perfluoroalkyl vinyl ether, or a combination thereof,
wherein a weight average molecular weight of the first binder is 1,000,000 Daltons or greater.

8. The cathode of claim 1, further comprising a third binder comprising fluorine, wherein the third binder does not comprise a polar functional group.

9. The cathode of claim 8, wherein the third binder comprises a repeating unit derived from vinylidene fluoride and the third binder has a weight average molecular weight of 1,000,000 Daltons or less.

10. The cathode of claim 8, wherein a weight ratio of the first binder to the third binder is from about 90:10 to about 10:90.

11. The cathode of claim 1, wherein the second binder comprises a cyano group.

12. The cathode of claim 1, wherein the second binder comprises a repeating unit derived from an acrylonitrile-containing monomer and a repeating unit derived from an olefin-containing monomer.

13. The cathode of claim 1, wherein the lithium transition metal oxide is a compound represented by Formula 1:

$Li_aNi_xCo_yM_zO_{2-b}A_b$ Formula 2 wherein, in Formula 2,
$1 \leq a \leq 1.2$, $0 \leq b \leq 0.2$, $0.3 \leq x < 1$, $0 < y \leq 0.4$, $0 < z \leq 0.4$, $x+y+z=1$,
M comprises manganese, vanadium, magnesium, gallium, silicon, tungsten, molybdenum, iron, chromium, copper, zinc, titanium, aluminum, boron, or a combination thereof, and
A is F, S, Cl, Br, or a combination thereof.

14. The cathode of claim 1, wherein the lithium transition metal oxide is a compound represented by Formula 3 or 4:

$LiNi_xCo_yMn_zO_2$ Formula 3

$LiNi_{x'}Co_{y'}Al_{z'}O_2$ Formula 4 wherein, in Formula 2, $0.3 \leq x < 1$, $0 < y \leq 0.4$, and $0 < z \leq 0.4$, and
wherein in Formula 3, $0.3 \leq x' < 1$, $0 < y' \leq 0.4$, and $0 < z' \leq 0.4$.

15. The cathode of claim 1, wherein an amount of the cathode active material is from about 95 weight percent to about 98.9 weight percent, an amount of the conductive material is from about 1 weight percent to 4 weight percent, and an amount of the binder is from about 0.01 weight percent to about 2 weight percent, based on the total combined weight of the cathode active material, the conductive material, and the binder, and
wherein a loading of the cathode is 3 milliampere hours per square centimeter or greater.

16. The cathode of claim 15, wherein the loading of the cathode is 5 milliampere hours per square centimeter or greater.

17. The cathode of claim 1, wherein the cathode has a bending range of motion of 90 degrees or greater during a flexural property test performed in accordance with ASTM D790.

18. The cathode of claim 1, wherein a maximum bending strength of the cathode obtained from a flexural property test performed in accordance with ASTM D790 is 1 Newton or less.

19. The cathode of claim 1, wherein a peel strength of the cathode obtained from a 180-degree peel strength test performed in accordance with ASTM D3330 is 0.3 gram-force per millimeter or greater.

20. The cathode of claim 1,
wherein the first binder comprises:
a repeating unit comprising the polar functional group;
a repeating unit derived from vinylidene fluoride; and
optionally, a repeating unit derived from tetrafluoroethylene, hexafluoropropylene, chlorotrifluoroethylene, a fluorovinyl group-containing monomer, a perfluoroalkyl vinyl ether, or a combination thereof, and
the second binder comprises a repeating unit derived from an acrylonitrile-containing monomer and a repeating unit derived from an olefin-containing monomer, and
the second binder is present in an amount of 0.1 to 0.5 wt %, based on a total combined weight of the cathode active material, the conductive material, and the binder.

21. The cathode of claim 20, wherein
the binder further comprises 0.01 to 1.5 wt % of a third binder based on a total combined weight of the cathode active material, the conductive material, and the binder, and
the third binder comprises a repeating unit derived from vinylidene fluoride.

22. A lithium battery comprising:
a cathode according to claim 1;
an anode; and
an electrolyte located between the cathode and the anode.

* * * * *